3,350,282
EXTRACTION DISTILLATION OF HYDROCARBON MIXTURES OF VARYING UNSATURATION
George D. Davis, Creve Coeur, and Earle C. Makin, St. Louis, Mo., assignors to Monsanto Company, St. Louis, Mo., a corporation of Delaware
Filed Nov. 19, 1964, Ser. No. 412,565
19 Claims. (Cl. 203—54)

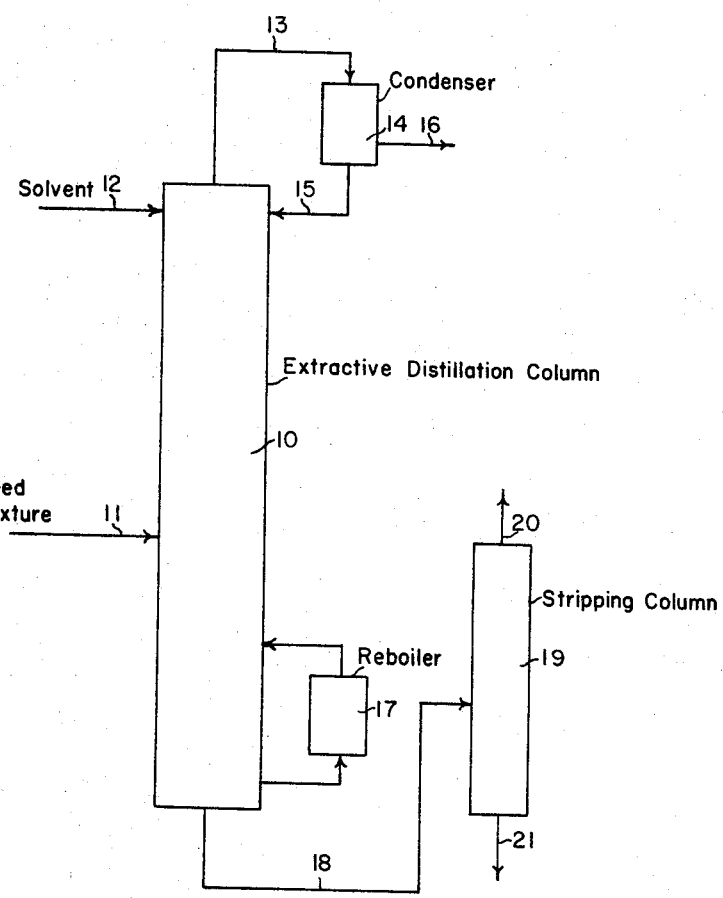

ABSTRACT OF THE DISCLOSURE

An extractive distillation process for the separation of mixtures of hydrocarbons of varying degrees of unsaturation which utilizes a solvent comprised of 50 to 90 percent by weight furfural, 5 to 20 percent by weight water, 0.1 to 10 percent by weight dimer oil and 5 to 20 percent by weight of a partially water-soluble alcohol.

---

The present invention relates to a process for the separation of hydrocarbons. More particularly, the present invention relates to a process for the separation of mixtures of hydrocarbons of varying degrees of unsaturation by extractive distillation. Specifically, the present invention relates to the separation of hydrocarbon mixtures by the selective removal of the more unsaturated hydrocarbon components therefrom by extractive distillation.

The use of furfural as a solvent for extractively distilling hydrocarbon mixtures containing hydrocarbons of varying degrees of unsaturation to selectively remove the more unsaturated hydrocarbons from such hydrocarbon mixtures is well known. It is also well known that the preferential selectivity of the furfural for the more unsaturated hydrocarbons may be enhanced by the addition of small amounts of water to the furfural solvent. However, when water is added to the furfural, the total solubility of absorbable hydrocarbons in the solvent is significantly reduced thereby reducing the volume of hydrocarbon which may be selectively removed per volume of solvent. Various solvents have been suggested for addition to the furfural-water system to increase the total solubility of absorbable hydrocarbons, usually referred to as loading capacity, in the furfural. However, the choice of solvents is a difficult one since many solvents have little or no effect on the loading capacity, or if loading capacity is increased, the furfural-water selectivity for the more unsaturated hydrocarbons is substantially reduced.

A second problem existing in the use of furfural for selectively absorbing more unsaturated hydrocarbons resides in the accumulation of polymeric oils, generally dimers of the more unsaturated hydrocarbons, within the solvent system. These polymer or dimer oils are difficult to separate from a furfural solvent system. If not removed from the furfural solvent system, these polymer or dimer oils result in a significant reduction in the selectivity of the furfural solvent system. Further, accumulation of these polymer or dimer oils in the furfural solvent system produces an unstable extractive distillation system. Water phases from the solvent system thereby producing flooding in the column and a general decline in separation efficiency.

It is an object of the present invention to provide a new and novel extractive distillation process for the separation of hydrocarbon mixtures containing hydrocarbons of varying degrees of unsaturation. Another object of the present invention is to provide a new and novel solvent system for the separation of hydrocarbon mixtures containing hydrocarbons of varying degrees of unsaturation by extractive distillation. It is another object of the present invention to provide a new and improved extractive distillation process and a solvent system for use therein whereby hydrocarbon mixtures comprised of hydrocarbons of varying degrees of unsaturation may be separated according to the degree of unsaturation. Yet another object of the present invention is to provide a new and novel furfural containing solvent system and extractive distillation process for its use, whereby more unsaturated hydrocarbons may be selectively removed from less unsaturated hydrocarbons with greater specificity and in greater quantities per unit volume of solvent used. A remaining object of the present invention is to provide a new and novel furfural-containing system and an extractive distillation process for its use whereby greater stability of the extractive distillation system is obtained. Additional objects will become apparent from the following description of the invention herein disclosed.

In fulfillment of these and other objects, it has been found that more unsaturated hydrocarbons may be more effectively separated from less unsaturated hydrocarbons by a process which comprises contacting a mixture of hydrocarbons of varying degrees of unsaturation with a solvent system comprised of 50 to 90 percent by weight furfural, 5 to 20 percent by weight water, 0.1 to 10 percent by weight dimer oil 5 to 20 percent by weight of a partially water-soluble alcohol selected from the group consisting of aromatic alcohols, heterocyclic alcohols and aliphatic alcohols at elevated temperatures and pressures sufficient to maintain the unabsorbed components of the hydrocarbon mixture in the vapor phase. The present invention provides several very distinct advantages over related prior art solvent systems and processes. First, the solubility of the more unsaturated hydrocarbons in the solvent system is substantially increased over furfural-water systems while obtaining an increased specificity of the solvent system for selectively absorbing the more unsaturated components of the mixture. Second, the amount of furfural necessary to accomplish a given separation is significantly reduced, thereby decreasing the cost of the extractive distillation process. A third advantage is found in the fact that it is no longer necessary to strip all of the dimer oil from the furfural-water solvent system but rather it is beneficial to leave certain amounts of the dimer oil in the solvent system. This latter advantage reduces the cost of the extractive distillation process by reducing the amount of furfural needed as well as the amount of furfural lost.

To further describe the present invention, reference is made to the accompanying drawing which presents a schematic presentation of a preferred embodiment of the present invention. Referring to the drawing, a feed mixture containing hydrocarbons of varying degrees of unsaturation is introduced into extractive distillation column 10 through line 11. Generally, the hydrocarbon is introduced in the vapor phase. The solvent system of the present invention is introduced into the column in the liquid phase through line 12 which attaches to column 10 at a point above line 11. The solvent flows downwardly through column 10, countercurrently contacting upwardly flowing vapors of the feed mixture. As the solvent and hydrocarbon feed contact one another, the more unsaturated hydrocarbons are preferentially absorbed. The portion of the feed mixture which is not absorbed by the solvent passes upwardly through extractive distillation column 10 and passes by means of line 13 into condenser 14. In condenser 14, this overhead distillate is condensed, a portion of the condensed material being returned to extractive distillation column 10 as a reflux by means of line 15. The remainder of the condensed material is passed from condenser 14 by line 16 to its future utility. The solvent and the absorbed hydrocarbons pass downwardly through extraction column 10 and are circulated through and heated in reboiler 17 which partially strips absorbed hydrocarbons from the solvent and vaporizes these hydrocarbons which then pass up through column 10. Solvent and absorbed hydrocarbons are removed from extractive distillation column 10 by means of line 18 and are passed into stripping column 19 in which absorbed hydrocarbons are stripped from the solvent and taken overhead by means of line 20 to their future utility. The stripped solvent passes from stripping column 19 by means of line 21 by which it may be passed back to line 12 as recycle to extraction column 10, to further processing or other disposition. In order to maintain the solvent system of the composition hereinafter described, it may be necessary to occasionally readjust the concentration of the components either by removing or adding one or more of the components of the four-component solvent system. Such treatment will generally take place either in conjunction with stripping column 19 or as a separate treatment of the solvent after it is passed from stripping column 19 by means of line 21. In addition, it may be necessary to have more than one stripping column in order to adequately strip the absorbed more unsaturated hydrocarbons from the solvent. Determination of the number and efficiency of stripping columns to adequately purify the solvent of the absorbed more unsaturated hydrocarbons is well within the ability of those skilled in the art.

It will be immediately apparent to those skilled in the art that many modifications of the above-described method for carrying out the present invention may be made. So long as such modifications require the solvent system of the present invention as well as the process conditions hereinafter disclosed, said modifications are within the spirit and scope of the present invention.

In order to further describe as well as to illustrate the present invention, the following examples are presented. These examples are not to be construed as limiting the present invention, however.

*Example I*

A hydrocarbon mixture consisting of approximately 35.9 mole percent butadiene, 41.3 mole percent butene-1, 15.9 mole percent butene-2 and 6.9 mole percent butanes was placed in a distillation unit of approximately one theoretical plate efficiency. To this was added a solvent composition consisting of 70 percent by weight furfural, 6 percent by weight dimer oil (principally 4-vinyl cyclohexene), 9 percent by weight water and 15 percent by weight benzyl alcohol. The weight ratio of solvent to hydrocarbon mixture was 3:1. The solvent-hydrocarbon mixture in the distillation unit was heated to a temperature of 140° F. and maintained at a pressure of 69.5 p.s.i.g. and refluxed until a constant composition vapor phase was obtained. The vapor phase was then sampled and found to have a composition of approximately 28.3 mole percent butadiene, 48.2 mole percent butene-1, 12.1 mole percent butene-2 (7.3% trans and 4.8% cis) and 11.4 mole percent butanes. The portion of the hydrocarbon mixture absorbed by the solvent was found to consist of 36.1 mole percent butadiene, 42.9 mole percent butene-1, 13.8 mole percent butene-2 (7.9% trans and 5.9% cis) and 7.2 mole percent butanes. The weight percent of the hydrocarbon mixture absorbed by the solvent was 18.2 which represented a solvent loading of 22.5 lbs. of hydrocarbons per 100 lbs. of solvent.

*Example II*

Example I was substantially repeated with the exception that the solvent system was 71 percent by weight furfural, 6 percent by weight dimer oil (principally 4-vinyl cyclohexane), 8 percent by weight water and 15 percent by weight tetrahydrofurfuryl alcohol. Also, the pressure in this demonstration was approximately 70 p.s.i.g. The vapor phase sample was composed of 28.2 mole percent butadiene, 48.1 mole percent butene-1, 12.4 mole percent butene-2 (7.5% trans and 4.9% cis) and 11.3 mole percent butanes. The portion of the hydrocarbon mixture absorbed by the solvent was found to consist of 36.5 mole percent butadiene, 42.8 mole percent butene-1, 13.9 mole percent butene-2 (7.9% trans and 6.0% cis) and 7.9 mole percent butanes. The weight percent of the hydrocarbon mixture absorbed by the solvent was 17.5 which represented a solvent loading of 21.5 lbs. of hydrocarbons per 100 lbs. of solvent.

To illustrate the superiority of the present solvent system over a conventional furfural-water solvent system, the relative volatility of a pair of the more difficulty separable components of the above hydrocarbon mixture was calculated for the two extractive distillation runs of Examples I and II and for an extractive distillation run made under substantially the same conditions and with the same feed using a conventional solvent system consisting of 95 percent by weight furfural and 5 percent by weight water. The pair of components selected were trans-butene-2 and butadiene which are very difficultly separable by ordinary distillation methods. Relative volatility for each of the runs was obtained by the following equation:

$$\text{Relative volatility} = \frac{A/B}{C/D}$$

$A=$ mole percent trans-butene-2 in vapor phase
$B=$ mole percent trans-butene-2 in liquid phase
$C=$ mole percent butadiene in vapor phase
$D=$ mole percent butadiene in liquid phase Relative volatility is a measure of the difference in volatility of two components under given conditions and the greater the relative volatility, the greater is the volatility difference. The relative volatility of the two hydrocarbons in the present of various solvents is a measure of the preferential selectivity of the solvent for one of the hydrocarbons. The relative volatility of trans-butene-2 and butadiene in the presence of the solvents and under the conditions of Examples I and II above and the furfural-water solvent above-described under substantially the same conditions are presented in the table below.

| Solvent: | Relative volatility |
|---|---|
| Furfural-water-dimer oil benzyl alcohol | 1.18 |
| Furfural-water-dimer oil-tetrahydrofurfuryl alcohol | 1.23 |
| Furfural-water | 1.14 |

From the table, it is apparent that the solvents of the present invention possess greater selectivity for the more unsaturated hydrocarbons, i.e., butadiene, than for the less unsaturated hydrocarbons, i.e., trans-butene-2.

In further illustration of the superiority of the solvents of the present invention over the conventional furfural-water described above, it was found that the weight percent of the hydrocarbon mixture absorbed by the furfural-water solvent was 15.7 which represented a solvent loading of 18.7 lbs. of hydrocarbons per 100 lbs. of solvent. Comparison of these results with those of Examples I and II above will demonstrate that not only do the solvents of the present invention possess increased selectivity, they also possess greater loading capacity for the absorbable hydrocarbons.

*Example III*

A two-inch diameter Oldershaw fractionating column of approximately 140 trays is employed in separating a hydrocarbon mixture of substantially the same composition as the mixture of Example I. The hydrocarbon mixture is introduced into the Oldershaw column at a point 66 trays from the bottom of the column at a rate of 90 liters per hour. A solvent system comprised of 70 percent by weight furfural, 6 percent by weight dimer oil, 9 percent by weight of water, and 15 percent by weight of benzyl alcohol is introduced into the fractionating column at a point 136 trays from the bottom of the column at a rate such as to cause a 12.8:1 solvent to feed weight ratio. The column is operated with a 2.2:1 reflux ratio (weight reflux to weight of hydrocarbon feed). The distillate obtained overhead is substantially free of butadiene. The solvent-butadiene mixture is continuously taken from the bottom of the column and subjected to distillation from which the butadiene is obtained in a concentration of approximately 91.5 percent; the balance consisting of essentially cis-butene-2 subsequently separated from the butadiene by fractionation.

The solvent system of the present invention is one comprised of 50 to 90 percent by weight of furfural, 0.1 to 10 percent by weight of dimer oil, 5 to 20 percent by weight of water, and 5 to 20 percent by weight of an alcohol selected from the group consisting of aromatic alcohols, heterocyclic alcohols, and aliphatic alcohols. A somewhat more preferred solvent system, however, is one which has a composition of 67 to 81 percent by weight of furfural, 4 to 8 percent by weight of dimer oil, 5 to 10 percent by weight of water, and 10 to 15 percent by weight of the alcohol.

The alcoholic component of the solvent system of the present invention is one selected from the group consisting of aromatic alcohols, heterocyclic alcohols and aliphatic alcohols and one which is partially water-soluble at the temperature at which the solvent will be used. By partially water-soluble is meant that at least 5 percent of the alcohol must be soluble in the water. The aromatic alcohol is usually one containing 7 to 20 carbon atoms, preferably 7 to 12 carbon atoms. The aromatic alcohol may contain one or more carbinol groups. Preferably, however, it will contain no more than two carbinol groups. Examples of aromatic alcohols which may be used in the practice of the present invention are benzyl alcohol, benzyl carbinol, phenol and one or more of the isomeric cresols and the like. The preferred aromatic alcohols are benzyl alcohol and benzyl carbinol.

The heterocyclic alcohols which may be used in the solvent compositions of the present invention include alcohol derivatives of such heterocyclic compounds as furan, thiophene, pyrrole, thiazole, pyrazole, imidazole, pyrans, thiopyrans, pyridine and the like. These heterocyclic alcohols may contain one or more carbinol groups, preferably, however, the heterocyclic alcohols will contain no more than one carbinol group. Particularly useful heterocyclic alcohols are tetrahydrofurfural alcohol, 1-(2-tetrahydrofuryl) ethanol, 1-(2-tetrahydrofuryl)-1-propanol and the like. Most often the heterocyclic alcohol will be one containing a single cyclic nucleus and containing either 5 or 6 members in the heterocyclic ring. Further, the carbinol group is usually attached directly to the heterocyclic nucleus or is attached to an alkyl substituent to the heterocyclic nucleus which alkyl substituent preferably will contain no more than 4 carbon atoms exclusive of the carbinol group.

The aliphatic alcohols useful in the solvent compositions of the present invention include both acyclic and alicyclic aliphatic alcohols. Also included within this group are the dihydric aliphatic alcohols or glycols. Several non-limiting examples of alcohols within this group are methanol, ethanol, propanol, butanol, pentanol, ethylene glycol, propylene glycol and triethylene glycol. The preferred aliphatic alcohols are the acyclic aliphatic alcohols of 2 to 5 carbon atoms. These alcohols may be straight-chain or branched-chain. Among the useful glycols preferred in the practice of the present invention are those containing 2 to 7 carbon atoms, either in straight-chain or branched-chain configuration.

In the choice of the proper alcohol for use in the solvent composition of the present invention, consideration should be given the boiling point of the alcohol in relation to that of furfural. The alcohol selected is preferably, as a practical matter, one which is not readily vaporizable from the solvent composition. Otherwise, it will be necessary to continuously add alcohol to the solvent system to maintain the solvent composition within the herein disclosed limits.

The dimer oil component of the solvent system of the present invention is a polymeric composition obtained from the dimerization of the more unsaturated hydrocarbons within the furfural solvent system, for example, the dimerization of butadiene in the presence of furfural yields a vinyl cyclohexene dimer oil. This dimer oil is most often a di-ethylenically unsaturated hydrocarbon and is usually cyclic in structure. It may be generally stated that the dimer oil contains unsaturated polymeric hydrocarbons having a number of carbon atoms approximately twice that of the more unsaturated hydrocarbons contained in the hydrocarbon mixture being separated by the solvent system of the present invention.

Any conventional distillation equipment may be used in practicing the invention herein disclosed. The present invention may be carried out either by batch distillation as illustrated in Example I and II or as a continuous distillation as is illustrated in Example III. Any conventional fractionating equipment may be used. The fractionation unit may be a packed column or it may be a column equipped with perforated plates, bubble trays or a system of baffles. The number of theoretical plates in the fractionating unit will depend upon the efficiency of separation desired, the precise composition of the feed mixture, the quantity of solvent, the reflux ratio and other related factors well known to those skilled in the art. The theoretical plate efficiency may be as low as 1 as illustrated in Examples I and II or may be as high as 100 and higher. The preferred fractionating column is one providing for countercurrent vapor liquid contact under reboiling and refluxing conditions and generally will have a theoretical plate efficiency of 25 to 200.

In practicing the present invention according to its preferred mode of practice, the feed mixture is introduced into the fractionating column at a point approximate to or below the mid-point of the column while the solvent is introduced at a point above the entry point of the feed mixture. The solvent most often is introduced into the extractive distillation column at a point at or near the top of the column. Generally, it will be preferred that the feed mixture be introduced at a point in the fractionating column of from 1/5 to 3/5 of the height of the column from the bottom of the column and that the solvent be introduced at a point no greater than 1/3 of the height of the column from the top of the column.

The quantity of solvent required in the present extractive distillation process in order to accomplish the desired separation will vary over relatively wide limits depending upon the efficiency of the separation desired and the equipment used. Generally, no less than one part by volume of solvent per part by volume of feed mixture will be used. The quantity of solvent may range as high as 10 to 20 volumes of solvent per volume of feed mixture. When practicing the present invention according to its preferred mode of practice, as dilution of the internal reflux becomes infinite, separation becomes sharper, but operating efficiency is lowered considerably because of the relatively small quantity of feed mixture being processed as infinite dilution is approached. Too large an excess of of solvent is, therefore, to be avoided in the preferred mode of practice.

The reflux ratio at which the column is operated will vary according to the theoretical plate efficiency of the column, the solvent of feed ratio, composition of the feed mixture and the separation desired. Generally, however, reflux ratios of 0.01:1 to 20:1 will suffice. It is preferred, however, that the reflux ratio be within the range of 0.5:1 to 5:1.

The present extractive distillation process may be carried out at atmospheric pressure or at subatmospheric pressures as well as at superatmospheric pressures. Generally, pressures within the range of from atmospheric to 200 p.s.i.g. will be used. Preferably, however, the pressure will be within the range of from approximately 40 to 80 p.s.i.g.

The temperatures at which the present extractive distillation process may be operated will vary quite widely depending upon the hydrocarbon mixture being separated. Generally, in the usual practice of the present invention, temperatures within the range of 0 to 400° F. will be employed. However, the temperatures optimum for separating, for example, a $C_3$ hydrocarbon mixture, are substantially different from those optimum for a $C_7$ hydrocarbon mixture. Optimum temperatures may be readily determined by those skilled in the art having the present teachings before them. When the present invention is utilized in accordance with the particularly preferred utility hereinafter defined, temperatures of 100 to 300° F.

The present invention is primarily directed to the separation of more unsaturated hydrocarbons from less unsaturated hydrocarbons. According to the present invention, paraffins may be separated from olefins, diolefins, acetylenes, etc., olefins may be separated from diolefins, triolefins, acetylenes, etc., diolefins may be separated from acetylenes, etc. Usually the hydrocarbon mixtures separated according to the present extractive distillation process are comprised primarily of hydrocarbons having no greater than 7 carbon atoms per molecule. In the preferred practice, the present invention finds its greatest utility in the separation of hydrocarbon mixtures comprised of hydrocarbons of varying degrees of unsaturation and having 3 to 5 carbon atoms per molecule. In the particularly preferred practice of the present invention, the present invention is used for the separation of diolefinic hydrocarbons of 3 to 5 carbon atoms from mono-olefinic and paraffinic hydrocarbons of 3 to 5 carbon atoms.

The more unsaturated hydrocarbons absorbed by the solvent composition of the present invention may be recovered from the solvent composition by any of the means well known to the art. These absorbed hydrocarbons may be removed from the solvent by a flash distillation, by fractionation, by stripping with a gas, or any other conventional means.

What is claimed is:

1. A process for the separation of mixtures of hydrocarbons of varying degrees of unsaturation having no greater than 7 carbon atoms per molecule which comprises extractively distilling said mixtures in the presence of a solvent comprising 50 to 90 percent by weight of furfural, 0.1 to 10 percent by weight of dimer oil, said dimer oil consisting essentially of di-ethylenically unsaturated hydrocarbons having a number of carbon atoms approximately twice that of the more unsaturated hydrocarbons contained in said mixtures, 5 to 20 percent by weight of water, and 5 to 20 percent by weight of a partially water-soluble alcohol selected from the group consisting of aromatic alcohols, heterocyclic alcohols and aliphatic alcohols, recovering an overhead distillate fraction from said distillation substantially richer in hydrocarbons of a lesser degree of unsaturation than said original mixture, removing the solvent fraction rich in the more unsaturated hydrocarbons of said mixture from said distillation and recovering from said rich solvent a fraction substantially richer in said more unsaturated hydrocarbons.

2. The process of claim 1 wherein the volume ratio of solvent to feed is at least 1:1.

3. The process of claim 1 wherein the alcohol is an aromatic alcohol.

4. The process of claim 1 wherein the alcohol is a heterocyclic alcohol.

5. The process of claim 1 wherein the alcohol is an aliphatic alcohol.

6. The process of claim 1 wherein the mixture of hydrocarbons of varying degrees of unsaturation is comprised of hydrocarbons having 3 to 5 carbon atoms per molecule.

7. The process of claim 1 wherein the extractive distillation is carried out at a pressure within the range of from atmospheric pressure to 200 p.s.i.g.

8. A process for the separation of mixtures of hydrocarbons of varying degrees of unsaturation having no greater than 7 carbon atoms per molecule which comprises continuously introducing said mixture into an intermediate section of a fractionating column, continuously introducing a solvent into the fractionating column at a point above the point of introduction of said mixture so that the solvent flows countercurrent to and intimately contacts the ascending vapors of said mixture, withdrawing overhead a hydrocarbon fraction substantially richer in hydrocarbons of a lesser degree of unsaturation than said mixture and removing from the bottom of said column a solvent fraction rich in the more unsaturated hydrocarbons of said mixture, said solvent introduced in said fractionating column being one comprised of 50 to 90 percent by weight of furfural, 0.1 to 10 percent by weight of dimer oil, 5 to 20 percent by weight of water and 5 to 20 percent by weight of a partially water-soluble alcohol selected from the group consisting of aromatic alcohols, heterocyclic alcohols and aliphatic alcohols, said dimer oil consisting essentially of di-ethylenically unsaturated hydrocarbons having a number of carbon atoms approximately twice that of the more unsaturated hydrocarbons contained in said mixtures.

9. The process of claim 8 wherein the volume ratio of solvent to feed is at least 1:1.

10. The process of claim 8 wherein the alcohol is an aromatic alcohol.

11. The process of claim 10 wherein the alcohol is a benzyl alcohol.

12. The process of claim 8 wherein the alcohol is a heterocyclic alcohol.

13. The process of claim 12 wherein the alcohol is a tetrahydrofurfuryl alcohol.

14. The process of claim 8 wherein the alcohol is an aliphatic alcohol.

15. The process of claim 14 wherein the alcohol is one of 2 to 5 carbon atoms per molecule.

16. The process of claim 8 wherein the mixture of hydrocarbons of varying degrees of unsaturation is comprised of hydrocarbons having 3 to 5 carbon atoms per molecule.

17. The process of claim 8 wherein the extractive distillation is carried out at a pressure within the range of from atmospheric pressure to 200 p.s.i.g.

18. The process of claim 8 wherein said fractionating column is one of 25 to 200 theoretical plate efficiency.

19. The process of claim 8 wherein a reflux rate of 0.01:1 to 20:1 is used.

References Cited

UNITED STATES PATENTS

| | | | |
|---|---|---|---|
| 2,325,379 | 7/1943 | Durrum | 203—63 X |
| 2,365,912 | 12/1944 | Souders | 203—63 X |
| 2,372,668 | 4/1945 | Hachmuth | 260—681.5 |
| 2,407,820 | 9/1946 | Durrum | 260—681.5 X |
| 2,415,192 | 2/1947 | Rittenhouse | 203—62 X |
| 2,434,796 | 1/1948 | Hachmuth | 203—54 |
| 2,911,452 | 11/1959 | Broughton | 203—55 X |
| 3,026,253 | 3/1962 | Woerner | 203—54 |

FOREIGN PATENTS 620,596  5/1961  Canada.

NORMAN YUDKOFF, *Primary Examiner.*

F. E. DRUMMOND, *Assistant Examiner.*